US012779904B2

(12) United States Patent
Bonaric et al.

(10) Patent No.: US 12,779,904 B2
(45) Date of Patent: Nov. 3, 2026

(54) TROLLEY INTEGRATED STABILIZATION SYSTEM COMBINED WITH WHEELS

(71) Applicant: Orthosoft ULC, Montreal (CA)

(72) Inventors: Patrice Bonaric, St Georges d'Orques (FR); Eric Roussel, Montferrier sur Lez (FR); Rodolphe Rubrecht, Liouc (FR)

(73) Assignee: Orthosoft ULC, Montreal (CA)

( * ) Notice: Subject to any disclaimer, the term of this patent is extended or adjusted under 35 U.S.C. 154(b) by 579 days.

(21) Appl. No.: 18/235,003

(22) Filed: Aug. 17, 2023

(65) Prior Publication Data

US 2024/0083197 A1 Mar. 14, 2024

Related U.S. Application Data

(60) Provisional application No. 63/406,555, filed on Sep. 14, 2022.

(51) Int. Cl.

*B60B 33/04* (2006.01)
*B60B 33/00* (2006.01)
*B62B 5/04* (2006.01)

(52) U.S. Cl.

CPC .......... *B60B 33/04* (2013.01); *B60B 33/0089* (2013.01); *B62B 5/049* (2013.01)

(58) Field of Classification Search

CPC ..... B60B 33/04; B60B 33/00; B60B 33/0089; B60B 33/0068; A61B 50/13; B62B 5/04; B62B 5/0433; B62B 5/049

See application file for complete search history.

(56) References Cited

U.S. PATENT DOCUMENTS 4,747,180 A * 5/1988 Screen ................ B60B 33/0042 16/33
9,771,092 B2 * 9/2017 Johnson ............... B60K 7/0007
(Continued)

FOREIGN PATENT DOCUMENTS

CN 111134995 5/2020
CN 111605365 9/2020
(Continued)

OTHER PUBLICATIONS

"European Application Serial No. 23197254.8, Extended European Search Report mailed Jan. 30, 2024", 6 pgs.
(Continued)

*Primary Examiner* — Steve Clemmons
(74) *Attorney, Agent, or Firm* — Schwegman Lundberg & Woessner, P.A.

(57) ABSTRACT

A trolley can be configured to maneuver an implement around a floor. The trolley can include a frame that can be configured to attach to the implement and a first wheel assembly that can be attached to the frame opposite the implement. A second wheel assembly can be attached to the frame opposite the implement. The first and second wheel assemblies can have a hollow center shaft. A first stabilizer cartridge can be inserted into the hollow center shaft of the first wheel assembly. A second stabilizer cartridge can be inserted into the hollow center shaft of the second wheel assembly. An actuator module can be attached to the frame and the first and second stabilizer cartridges. The actuator module can move the first and second stabilizer cartridges within the hollow center shaft of the first and second wheel assemblies, respectively.

18 Claims, 10 Drawing Sheets

(56) References Cited

U.S. PATENT DOCUMENTS

| | | | | |
|---|---|---|---|---|
| 10,640,136 | B2 * | 5/2020 | Nahum | B60B 33/0005 |
| 10,813,808 | B2 * | 10/2020 | Fiedler | A61G 13/104 |
| 2006/0010643 | A1 * | 1/2006 | Hornbach | B60B 33/0018 16/19 |

FOREIGN PATENT DOCUMENTS

| | | | | | |
|---|---|---|---|---|---|
| CN | 111134995 | B | * | 9/2021 | A61B 50/13 |
| DE | 102019121482 | A1 | * | 2/2021 | B60B 33/0089 |
| EP | 4338697 | B1 | | 4/2026 | |
| WO | 2017040988 | | | 3/2017 | |
| WO | 2018237270 | | | 12/2018 | |
| WO | WO-2020178511 | A1 | | 9/2020 | |

OTHER PUBLICATIONS

"European Application Serial No. 23197254.8, Response Filed Sep. 12, 2024 to Extended European Search Report mailed Jan. 30, 2024", 74 pgs.
"European Application Serial No. 23197254.8, Communication Pursuant to Article 943 EPC mailed Mar. 31, 2025", 5 pgs.
"European Application Serial No. 23197254.8, Response filed Jul. 25, 2025 to Communication Pursuant to Article 943 EPC mailed Mar. 31, 2025", W English Claims, 17 pgs.

* cited by examiner

TROLLEY INTEGRATED STABILIZATION SYSTEM COMBINED WITH WHEELS

CLAIM OF PRIORITY

This application claims the benefit of U.S. Provisional Patent Application Ser. No. 63/406,555, filed on Sep. 14, 2022, the benefit of priority of which is claimed hereby, and which is incorporated by reference herein in its entirety.

BACKGROUND

The present disclosure relates to a trolley. More specifically, the present disclosure relates to a trolley with a stabilization system.

Trolleys can be used to move various machines, robots, or any other kind of implement. Sometimes, such as when a trolley can be used to move a surgical robot, the stabilization of the robot and the trolley can be important. Robots can be used for surgeries on the brain, spine, knee, hip, shoulder, or any other part of a patient's body. The trolley can allow the robot to be moved about an operation room while limiting the footprint that the robot and the trolley occupy.

SUMMARY

The inventors of the present disclosure have recognized at least the following problems with trolleys generally: 1) stability systems installed on a trolley can take up too much floor space surrounding the trolley, which can make the system using the trolley cumbersome, and 2) stability systems can take up too much space on the underside of the trolley, which can make wheel placement on the trolley difficult. The inventors of the present disclosure have also recognized at least the following problems with trolleys attached to robots used in surgical procedures: 1) instability of the robot on the trolley can result in imprecise movements of the robot, and 2) trolleys equipped with stabilization systems can take up too much space limiting the movement of doctors, nurses, or other staff around the robot within an operating room, which can result in cumbersome operating rooms. The following examples are non-limiting solutions to at least the above-identified problems identified by the inventors of the present disclosure.

In one example, a trolley can be configured to maneuver an implement around a floor. The trolley can include a frame that can be configured to attach to the implement and a first wheel assembly that can be attached to the frame opposite the implement. A second wheel assembly can be attached to the frame opposite the implement. The first and second wheel assemblies can have a hollow center shaft. A first stabilizer cartridge can be inserted into the hollow center shaft of the first wheel assembly. A second stabilizer cartridge can be inserted into the hollow center shaft of the second wheel assembly. An actuator module can be attached to the frame and the first and second stabilizer cartridges. The actuator module can move the first and second stabilizer cartridges within the hollow center shaft of the first and second wheel assemblies, respectively.

In another example, a trolley for moving and stabilizing a surgical robot within an operating room. The trolley can include a frame that can be configured to attach to the surgical robot and two or more wheel assemblies. Each of the two or more wheel assemblies can include a hollow center shaft. A stabilization cartridge can be inserted into the hollow center shaft of each of the two or more wheel assemblies. The trolley can also include one or more actuator modules. Each of the one or more actuator modules can be attached to the frame and the stabilization cartridge within each of the two or more wheel assemblies. The actuator modules can move each of the stabilization cartridges within the hollow center shaft of the two or more wheel assemblies to a first position, a second position, and a third position.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure relates to a trolley including an integrated stabilization system combined with wheels that can operate between a first position, a second position, and a third position. In the first position, the stabilization system can be positioned so that the stabilization system is positioned away from a surface of the floor so that the trolley can be freely moved. In the second position, the stabilization system can be positioned so that the stabilization system begins to contact the surface of the floor to act as a brake or to stabilize the trolley. In the third position, the stabilization system can be positioned so that the stabilization system can apply a pre-determined force on the floor to stabilize the trolley. The trolley with an integrated stabilization system combined with wheels will be discussed in greater detail with reference to FIGS. 1-10.

The above discussion is intended to provide an overview of subject matter of the present patent application. It is not intended to provide an exclusive or exhaustive explanation of the invention. The description below is included to provide further information about the present patent application.

Figure 1:
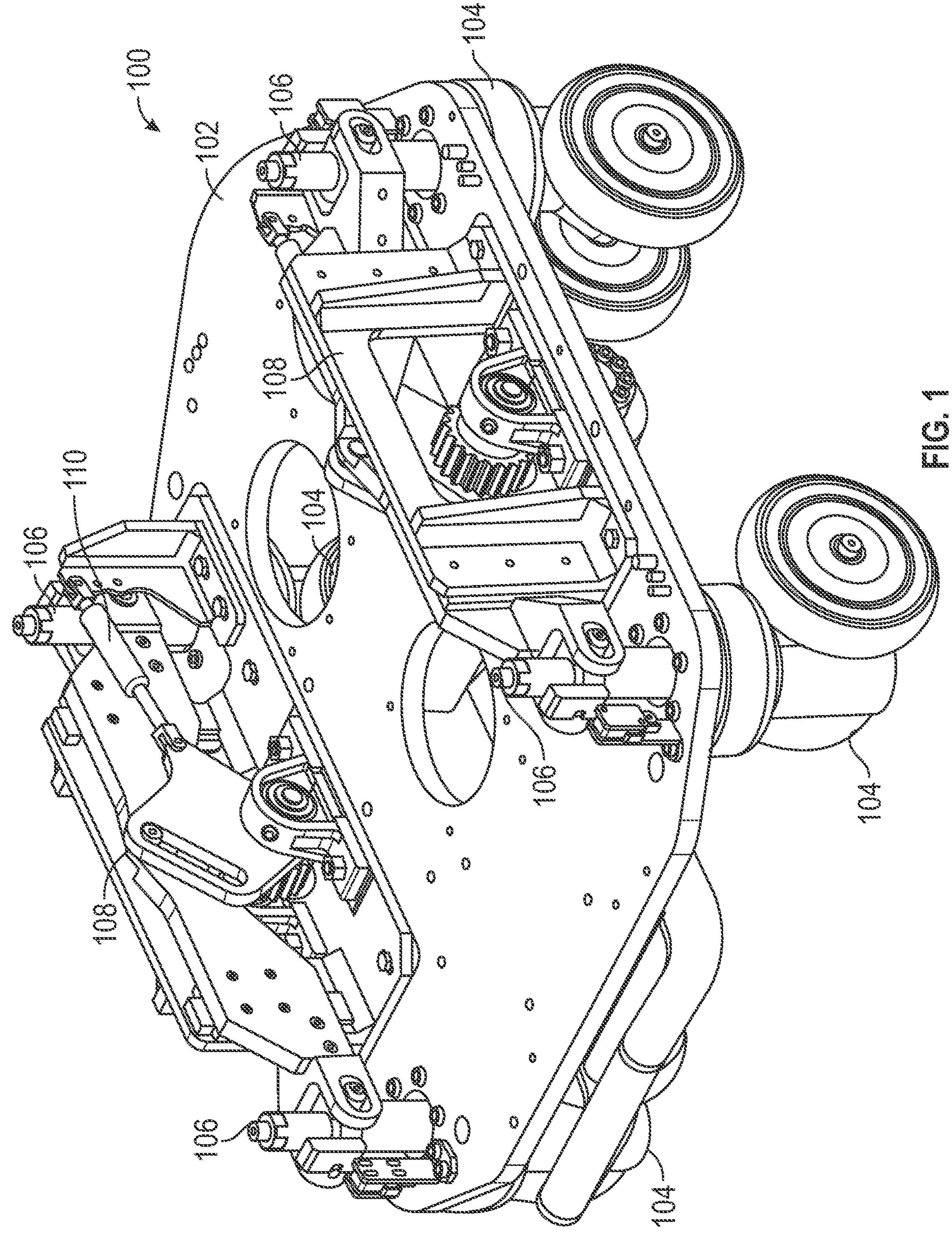
FIG. 1 is a perspective view of a trolley, in accordance with at least one example of the present disclosure.

FIG. 1 is a perspective view of an example of a trolley 100. The trolley 100 can be configured to maneuver and stabilize a robot or an implement around a room. In one example, the trolley 100 can be used to move and stabilize a surgical robot around an operating room. In another example, the trolley 100 can be used to move and stabilize a robotic welder around a factory floor. In yet another example, the trolley 100 can be used to move and stabilize any other implement around a room. The trolley 100 can include a frame 102, two or more wheel assemblies (hereinafter referred to as the wheel assemblies 104), two or more stabilizer cartridges (hereinafter referred to as the stabilizer cartridges 106), one or more actuator modules (hereinafter referred to as the actuator modules 108), and one or more springs (hereinafter referred to as spring 110).

The frame 102 can be configured to attach to a robot or an implement and to support the robot or the implement. The frame 102 can be a monolithic plate made from steel, stainless steel, titanium, aluminum, or any alloy or combination thereof. In an example, the frame 102 can be multiple plates, channels, angle iron, or any other shape of material combined to form a singular body to attach to the robot or the implement. The frame 102 can include a plurality of holes to accommodate the attachment and movement of other components of the trolley 100. In examples, the frame 102 can include holes to attach a robot or an implement thereto. In another example, the frame 102 can include an attachment mechanism that is formed on or within the frame 102 to permit the attachment of the robot or the implement to the trolley 100. The frame 102 can be sized to match the required load of the robot or implement. For example, a larger robot or implement can require the frame 102 to be thicker or larger in a lengthwise and height-wise direction.

The wheel assemblies 104 can be attached to the frame 102 opposite the robot or the implement. In examples, the wheel assemblies 104 can be removably attached to the frame 102, for example, attached by nuts and bolts, or with any other removable fastener. In another example, the wheel assemblies 104 can be permanently attached to the frame 102, for example, the wheel assemblies 104 can be welded or any other form of permanently attached to the frame 102. In the example shown in FIG. 1, there can be four of the wheel assemblies 104 attached to the frame 102. In another example, there can be less than four of the wheel assemblies 104 attached to the frame 102, for example, two or three of the wheel assemblies 104 can be attached to the frame 102. In another example, there could be more than four of the wheel assemblies 104 attached to the frame 102, for example, five or more of the wheel assemblies 104 can be attached to the frame 102. The wheel assemblies 104 will be discussed in greater detail below with reference to FIGS. 2 and 3.

Each of the stabilizer cartridges 106 can be configured to be inserted into each of the wheel assemblies 104. The stabilizer cartridges 106 can act as a brake to stop the trolley 100 or hold the trolley 100 in a specific place, and as a stabilizer, to stabilize the trolley 100 and the robot or implement. Because the stabilizer cartridges 106 can be configured to be inserted into each of the wheel assemblies 104, the wheel assemblies 104 and the stabilizer cartridges 106 can take up less space and help decrease the space that the trolley 100 occupies. The stabilizer cartridges 106 will be discussed in more detail below with reference to FIG. 4.

The actuator modules 108 can be attached to the frame 102 and the stabilizer cartridges 106. The actuator modules 108 can be configured to move each of the stabilizer cartridges 106 within each of the wheel assemblies 104, respectively. In one example, the actuator modules 108 can be a cam system operated by manual manipulation to actuate the stabilizer cartridges 106 within the wheel assemblies 104. In another example, the actuator modules 108 can be a motor. For example, the actuator modules 108 can be an electric motor that is controlled by one or more controllers to control the actuator modules 108 and actuate the stabilizer cartridges 106 within the wheel assemblies 104. The actuator modules 108 will be discussed in more detail below with reference to FIGS. 5-8.

The spring 110 can be configured to prevent backward or unwanted movement of the actuator modules 108. The spring 110 can be attached to the frame 102 and the actuator modules 108. The spring 110 can be biased to the extended position such that the spring 110 resists unwanted movement of the actuator modules 108. The spring 110 will be discussed in greater detail below with reference to FIGS. 6-8.

Figure 2:
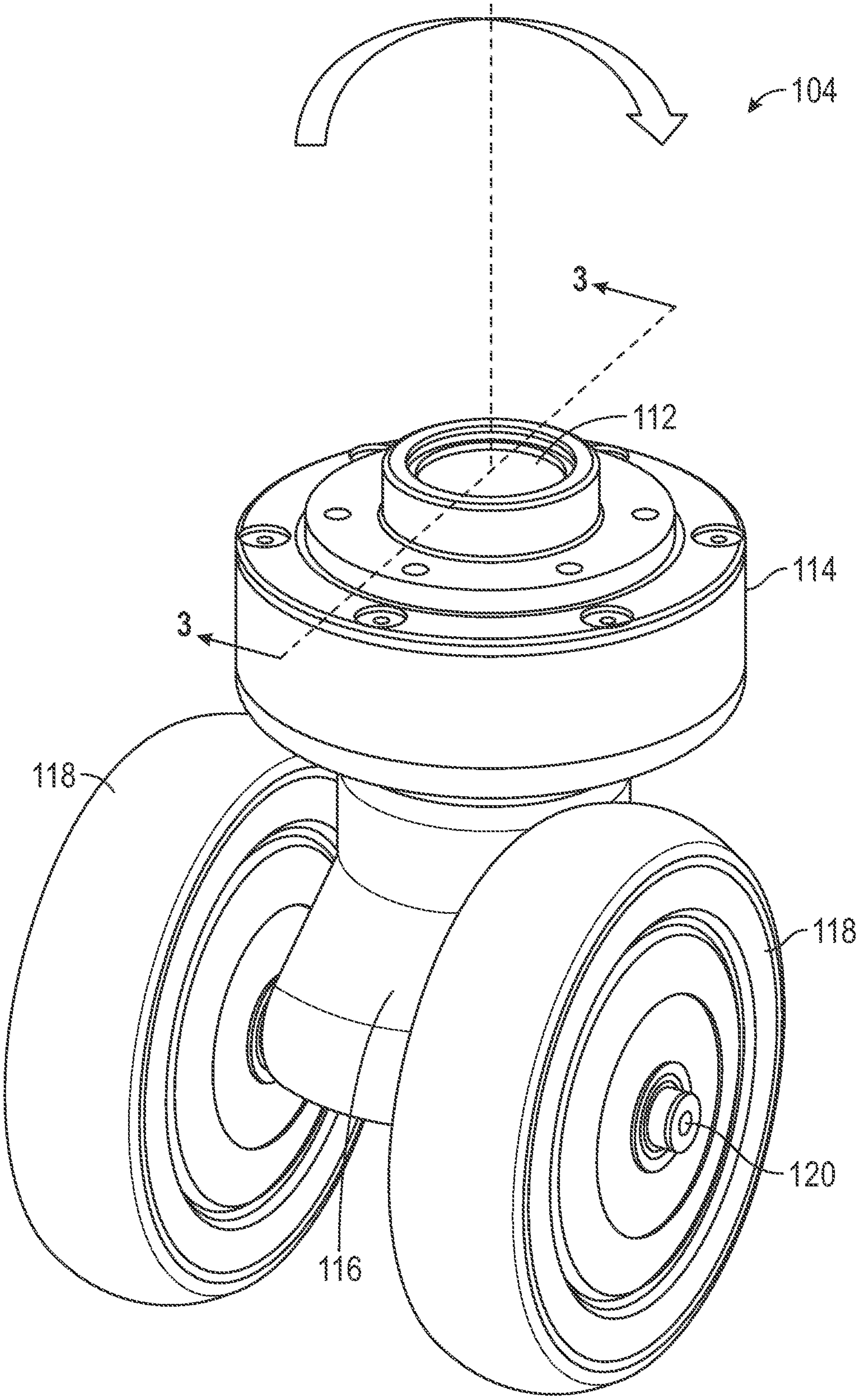
FIG. 2 is a perspective view of a wheel assembly, in accordance with at least one example of the present disclosure.
Figure 3:
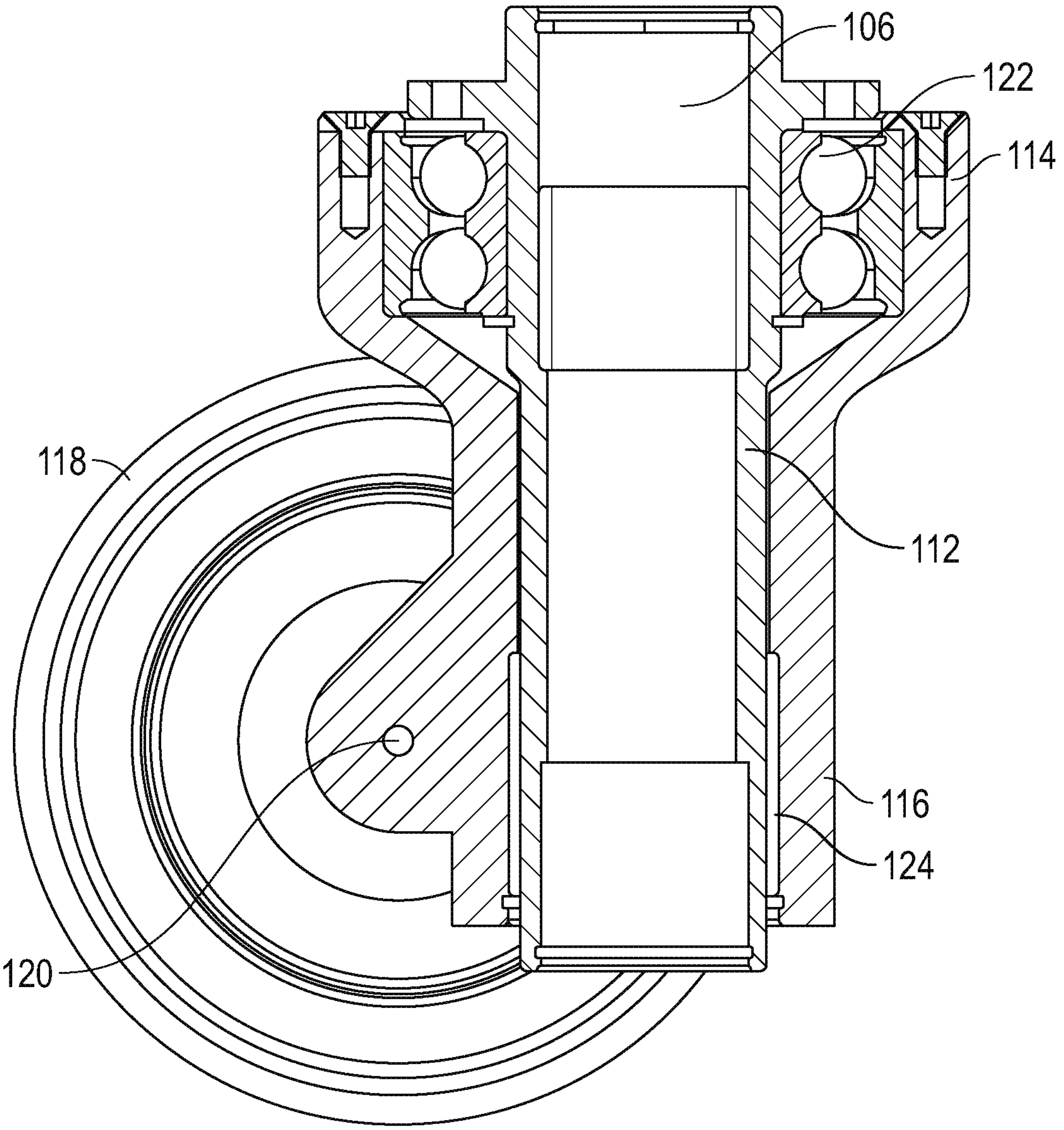
FIG. 3 is a cross-sectional view of a wheel assembly taken along line 3-3 from FIG. 2, in accordance with at least one example of the present disclosure.

The wheel assemblies 104 will be discussed with references to FIGS. 2 and 3. FIG. 2 is a perspective view of an example of the wheel assemblies 104. The wheel assemblies 104 are configured to navigate the trolley 100. FIG. 3 is a cross-sectional view of a wheel assembly taken along line 3-3 from FIG. 2.

The wheel assemblies 104 can include a hollow center shaft 112, a hub 114, a housing 116, and a pair of wheels 118 attached to the wheel assemblies 104 via an axle 120. As shown in FIG. 3, the wheel assemblies 104 can also include a first bearing assembly 122 and a second bearing assembly 124.

The hollow center shaft 112 can be concentric a central axis CA of the wheel assemblies 104. The hollow center shaft 112 can be configured to receive the stabilizer cartridges 106 and permit the stabilizer cartridges 106 to move therein. Because the stabilizer cartridges 106 can travel through the hollow center shaft 112 the integrated stabilization system with wheels takes up less space and more effectively stabilizes the trolley 100 and any robot or implement attached to the trolley 100. For example, because the stabilizer cartridges 106 are within the hollow center shaft 112 of the wheel assemblies 104, the wheel assemblies 104 and the stabilizer cartridges 106 can be more spread apart on the frame 102 which can increase the stability of the trolley 100.

The hub 114 can surround the hollow center shaft 112. As shown in FIG. 1, the hub 114 can have a diameter that is greater than the rest of the wheel assemblies 104. The increased diameter of the hollow center shaft 112 helps distribute the forces between the frame 102 and the wheel assemblies 104. The distribution of forces between the frame 102 and the wheel assemblies 104 can reduce the stress and strain applied to the frame 102 and the wheel assemblies 104 as the trolley 100 is being moved about the room, or the robot or the implement is operating or being used. The hub 114 can be generally cylindrical and can extend any distance to increase or decrease the clearance between the frame 102 and the floor. For example, the hub 114 can extend more to increase the clearance between the frame 102 and the floor so that the wheel assemblies 104 can accommodate larger wheels 118. In another example, the hub 114 can extend less to decrease the clearance between the frame 102 and the floor to decreases a tipping force on the trolley 100 increase the stability of the trolley 100 while the trolley 100 moves around the room.

The housing 116 can be connected to the hub 114 and extend from the hub 114 surrounding the hollow center shaft 112. The housing 116 can extend any length from the hub 114 to increase or decrease the clearance between the frame 102 and the floor. For example, the housing 116 can extend more to increase the clearance between the frame 102 and the floor so that the wheel assemblies 104 can accommodate larger wheels 118. In another example, the housing 116 can extend less to decrease the clearance between the frame 102 and the floor to decrease a tipping force on the trolley 100 and increase the stability of the trolley 100 while the trolley 100 moves around the room. The housing 116 can be configured to receive the axle 120 to support the wheels 118.

The wheels 118 can be configured to receive the axle 120 on opposite sides of the hollow center shaft 112. The wheels 118 can be made from rubber, metal, polymers, composites, or any combination thereof. In one example, the wheels 118 can be monolithic. In another example, the wheels 118 can be made from multiple different materials. For example, the wheels 118 can have a polymer core extending from a center, and a band of rubber attached to the periphery of the polymer core. The wheels 118 can include a bearing at the center of the wheels 118. As shown in FIGS. 2 and 3, each of the wheel assemblies 104 can include two of the wheels 118. In another example, each of the wheel assemblies 104 can include one of the wheels 118. In yet another example, each of the wheel assemblies 104 can include more than two of the wheels 118, for example, three, four, five, or more of the housing 116 can be attached to each of the wheel assemblies 104. As shown in the figures, each of the wheel assemblies 104 can include the same number of the wheels 118. In another example, each of the wheel assemblies 104 attached to the frame 102 can include a different amount of the wheels 118.

The axle 120 can extend through the housing 116 and be configured to attach the wheels 118 to the wheel assemblies 104. The axle 120 can be made from steel, stainless steel, aluminum, titanium, or any alloy or combination thereof. The axle 120 can have different diameters to match the design requirements of the trolley 100. For example, the axle 120 can be made from a material have a diameter that enables the axle 120 to withstand all forces applied to the axle 120 from the weight of the trolley 100 and the weight of the robot or implement attached to the trolley 100. In examples, a lighter-weight version of the trolley 100 can be made from a lighter material (e.g., aluminum) and have a smaller diameter for the axle 120, and a heavy-duty version of the trolley 100 can be made from a stronger material (e.g., titanium or steel) and have a larger diameter for the axle 120.

The first bearing assembly 122 can be configured to permit rotation of the wheel assemblies 104 about the central axis CA. The first bearing assembly 122 can be installed between the hollow center shaft 112 and the hub 114. In examples, the first bearing assembly 122 can be ball bearings. In another example, the first bearing assembly 122 can be any other bearing that aids in the rotation of the wheel assemblies 104 about the central axis CA. For example, the first bearing assembly 122 can be roller bearings, fluid bearings, magnetic bearings, plain bearings, any other type of bearing used to aid in the rotation of a body, or any combination thereof.

The second bearing assembly 124 can be configured to permit movement of the stabilizer cartridges 106 within the hollow center shaft 112 and the housing 116. The second bearing assembly 124 can be installed between the hollow center shaft 112 and the housing 116. The second bearing assembly 124 can be a sleeve bearing. The second bearing assembly 124 can be any other bearing that aids in the longitudinal movement of the stabilizer cartridges 106 within the hollow center shaft 112 and the housing 116. The second bearing assembly 124 can be a bushing, journal bearing, plain bearing, any other bearing that can aid in the movement of the stabilizer cartridges 106 within the hollow center shaft 112 and the housing 116, or any combination thereof. The stabilizer cartridges 106 can engage with the second bearing assembly 124 to determine the maximum height the stabilizer cartridges 106 can be raised to within the hollow center shaft 112 and the housing 116. In another example, the maximum height of the stabilizer cartridges 106 within the hollow center shaft 112 and the housing 116 can be determined by the actuator modules 108.

Figure 4:
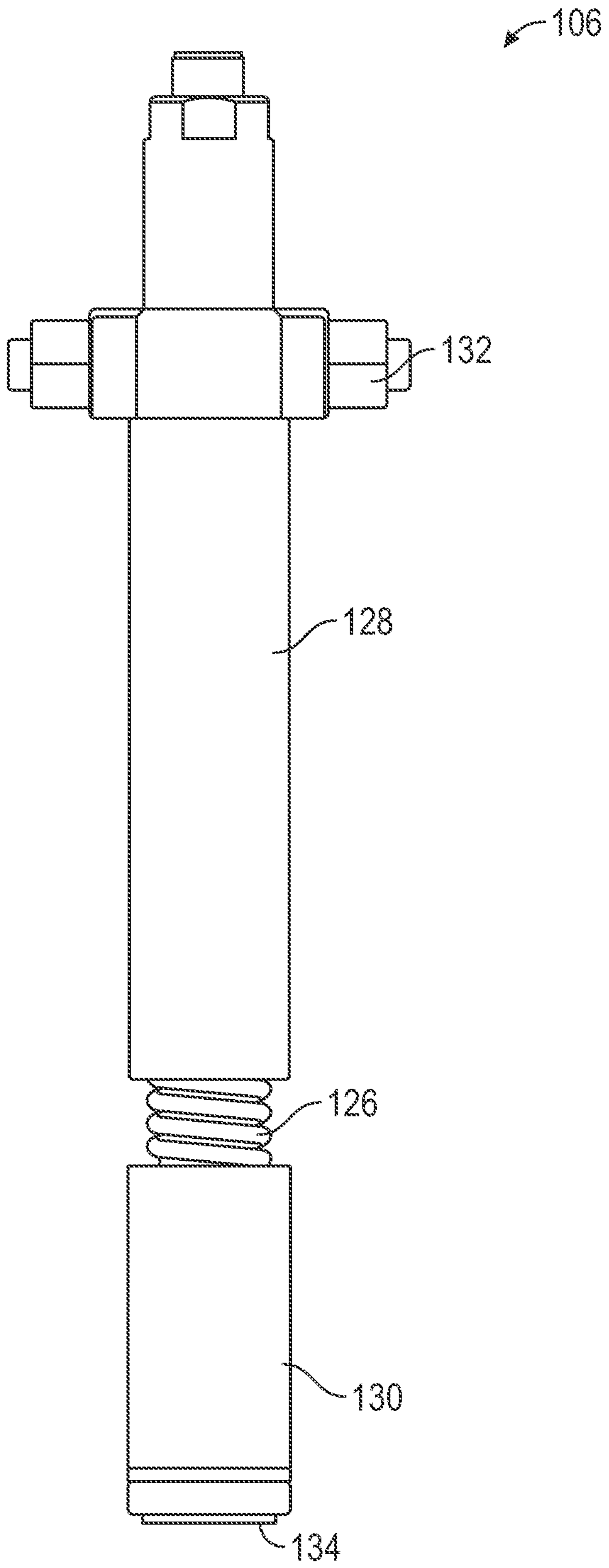
FIG. 4 is a side view of a stability cartridge, in accordance with at least one example of the present disclosure.

FIG. 4 is a side view of an example of the stabilizer cartridges 106. In examples, the stabilizer cartridges 106 can be an elongated body that extends a set distance. The set distance can be determined based on the length of the hub 114 and the housing 116. As shown in FIG. 4, the stabilizer cartridges 106 can include a spring 126, a first sheath 128, and a second sheath 130.

The spring 126 can be configured to apply a pre-determined force to the floor when the stabilizer cartridges 106 is compressed. A trolley 100 can come with multiple kits of the stabilizer cartridges 106 that each have a different spring 126. The different spring 126 can each have a different stiffness to change the pre-determined force that the stabilizer cartridges 106 applies to the floor. For example, a heavy-duty trolley 100 that can hold a heavy robot or implement can use a spring 126 with an increased stiffness so that the stabilizer cartridges 106 can apply a greater pre-determined force to the floor to stabilize the trolley 100 and the robot or implement attached thereto. In another example, a light-duty trolley 100 that can hold a light robot or implement can use a spring 126 with a decreased stiffness so that the stabilizer cartridges 106 can apply a decreased pre-determined force to the floor to stabilize the trolley 100 and the robot or implement attached thereto.

The first sheath 128 can be configured to surround the spring 126. In examples, the first sheath 128 can at least partially surround the spring 126. The first sheath 128 can also engage the spring 126 to prevent the spring 126 from vertical movement within the first sheath 128 so that the spring 126 compresses as a force is applied to the stabilizer cartridges 106. In examples, the first sheath 128 can have a groove to prevent the vertical movement of the spring 126 within the first sheath 128. In another example, the first sheath 128 can have any other feature that can impinge the vertical movement of the spring 126 within the first sheath 128. The first sheath 128 can be a generally elongated body. As shown in FIG. 4, the first sheath 128 can include an attachment mechanism 132.

The attachment mechanism 132 can be configured to attach to the actuator modules 108. As the actuator modules 108 apply a force on the attachment mechanism 132 can transfer the applied force to the stabilizer cartridges 106 to move the stabilizer cartridges 106 with relation to the hollow center shaft 112 of the wheel assemblies 104. In examples, the attachment mechanism 132 can be a collar that bolts on, or removably attaches to the actuator modules 108. In another example, the attachment mechanism 132 can be a bolt or any other fastener (e.g., a ring, a socket, or any other removable fastener) that is formed on the periphery of the first sheath 128.

The second sheath 130 can be configured to surround the spring 126. In examples, the second sheath 130 can at least partially surround the spring 126. In examples, the second sheath 130 can move toward the first sheath 128 when force is applied to the stabilizer cartridges 106. The relationships between the first sheath 128 and the second sheath 130 during the movement of the stabilizer cartridges 106 will be discussed below with reference to FIG. 9. As shown in FIG. 4, the second sheath 130 can include a contact foot 134.

The contact foot 134 can be configured to contact the surface of the floor and apply a force to the floor via a force generated by the stabilizer cartridges 106. The contact foot 134 can be attached to the second sheath 130. In another example, the contact foot 134 can be integral to the second sheath 130. Here, the contact foot 134 and the second sheath 130 can be monolithic and formed as a single continuous part. In examples, the contact foot 134 can be rubber, polymer, or any other material that has a large static coefficient of friction. In examples, the contact foot 134 can be replaced if the contact foot 134 becomes worn. In some examples, the contact foot 134 can be textured to increase the frictional forces between the floor and the contact foot 134.

Figure 5:
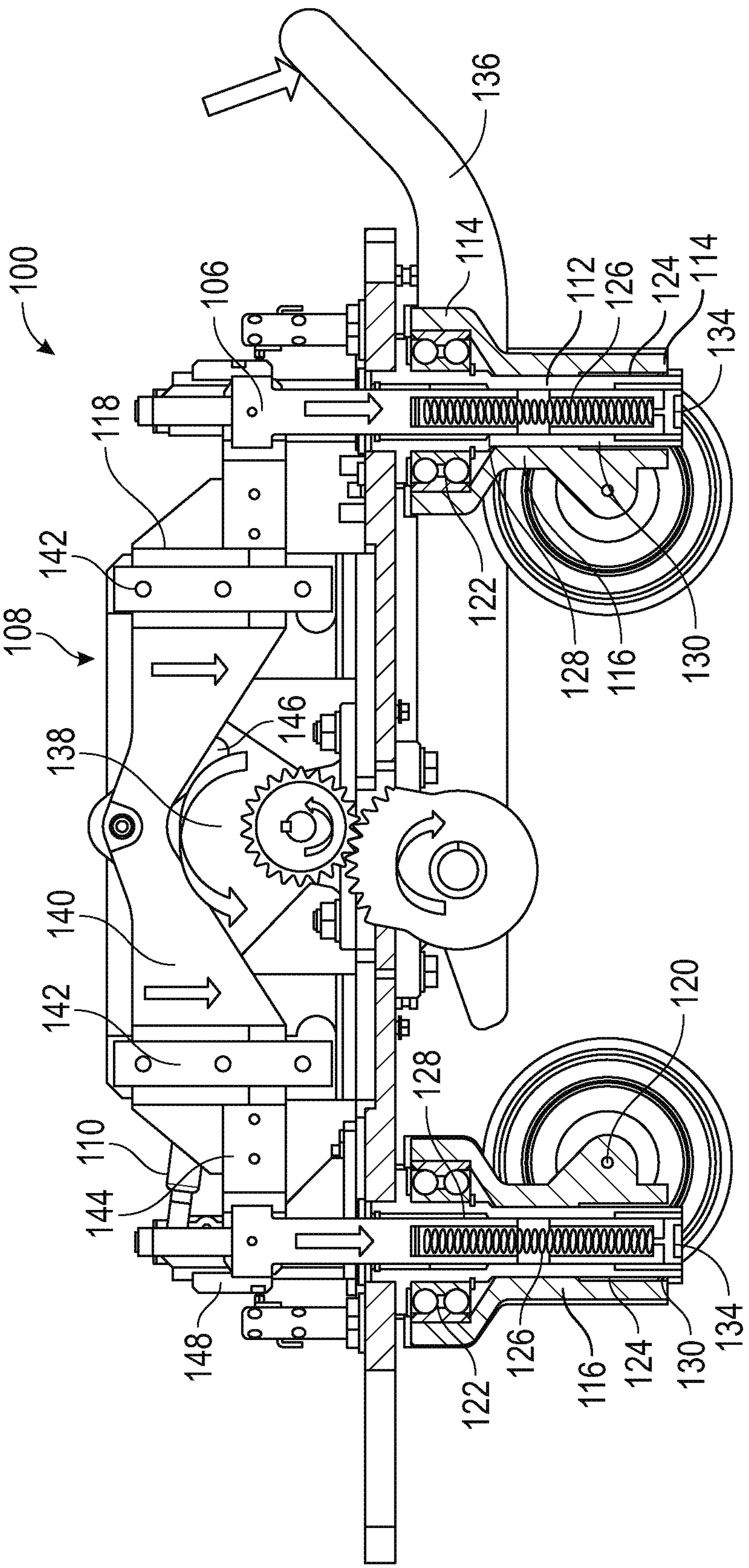
FIG. 5 is a side view of a trolley, in accordance with at least one example of the present disclosure.

FIG. 5 is a side view of the trolley 100 showcasing the functionality of one example of the actuator modules 108. As shown in FIG. 5, the actuator modules 108 can include an engagement mechanism 136, a cam 138, a lift bar 140, a linear motion system 142, and an attachment mechanism 144.

The engagement mechanism 136 can be pivotably attached to the frame. The engagement mechanism 136 can be a lever, pedal, button, or any other mechanism that can be manipulated to position the cam 138. As shown in FIG. 5, the engagement mechanism 136 can be a pedal with a pivot point about its attachment to the frame 102. In examples, the length of the engagement mechanism 136 can be adjusted to change the ease of articulation of the actuator modules 108. For example, the engagement mechanism 136 can be longer to decrease the force required to articulate the actuator modules 108. In some examples of the trolley 100, the engagement mechanism 136 can be the only part of the integrated stabilization system with wheels that extends beyond the periphery of the frame 102. In one example, the engagement mechanism 136 can include a gear attached to the contact foot 134 to mechanically communicate with the cam 138. In another example, the gear can be integral the engagement mechanism 136.

The cam 138 can be pivotably attached to the frame 102 and mechanically connected or coupled to the engagement mechanism 136. In examples, the cam 138 can include a gear in mechanical communication with the gear on the engagement mechanism 136 such that rotation of the engagement mechanism 136 will generate an opposite rotation of the cam 138. The cam 138 can include a slot 146 formed therein. The slot 146 can rotate with the cam 138 to help guide a connection point with the lift bar 140 and move the lift bar 140 relative to the movement of the engagement mechanism 136.

In one example, the lift bar 140 can include a bearing that can roll in the slot 146. Here, the bearing can reduce friction between systems as the bearing rolls in the slot 146. In another example, the lift bar 140 can include a pin. The pin can be configured to mechanically connect to the cam 138 such that the pin of the lift bar 140 can within the slot 146 of the cam 138. Thus, as the cam 138 rotates, the pin can move within the slot 146 and move the lift bar 140.

The linear motion system 142 can be configured to limit the degrees of freedom of the lift bar 140. In examples, the linear motion system 142 can fit around the lift bar 140 such that the lift bar 140 can only move linearly. For example, the linear motion system 142 can ensure that the lift bar 140 can only move toward or away from the frame 102. Thus, the linear motion system 142 can surround the lift bar 140 to prevent any twist, bow, or any other deformation of the lift bar 140. The linear motion system 142 can ensure that only linear motion is transferred through the lift bar 140 from the cam 138 to the attachment mechanism 144.

The attachment mechanism 144 can be configured to transfer forces from the lift bar 140 to the stabilizer cartridges 106 to move the stabilizer cartridges 106 within the wheel assemblies 104 in response to articulation of the actuator modules 108. Specifically, the attachment mechanism 144 can be configured to attach to the attachment mechanism 132 on the first sheath 128 of the stabilizer cartridges 106. In examples, the attachment mechanism 144 can be integral to the lift bar 140. In another example, the attachment mechanism 144 can be removably coupled to the lift bar 140.

As discussed above, the actuator modules 108 can articulate to position the stabilizer cartridges 106 in different positions relative to the frame 102 and the wheel assemblies 104. Three example positions, a first position 150, a second position 160, and a third position 170 will be discussed below with reference to FIGS. 6-7.

Figure 6:
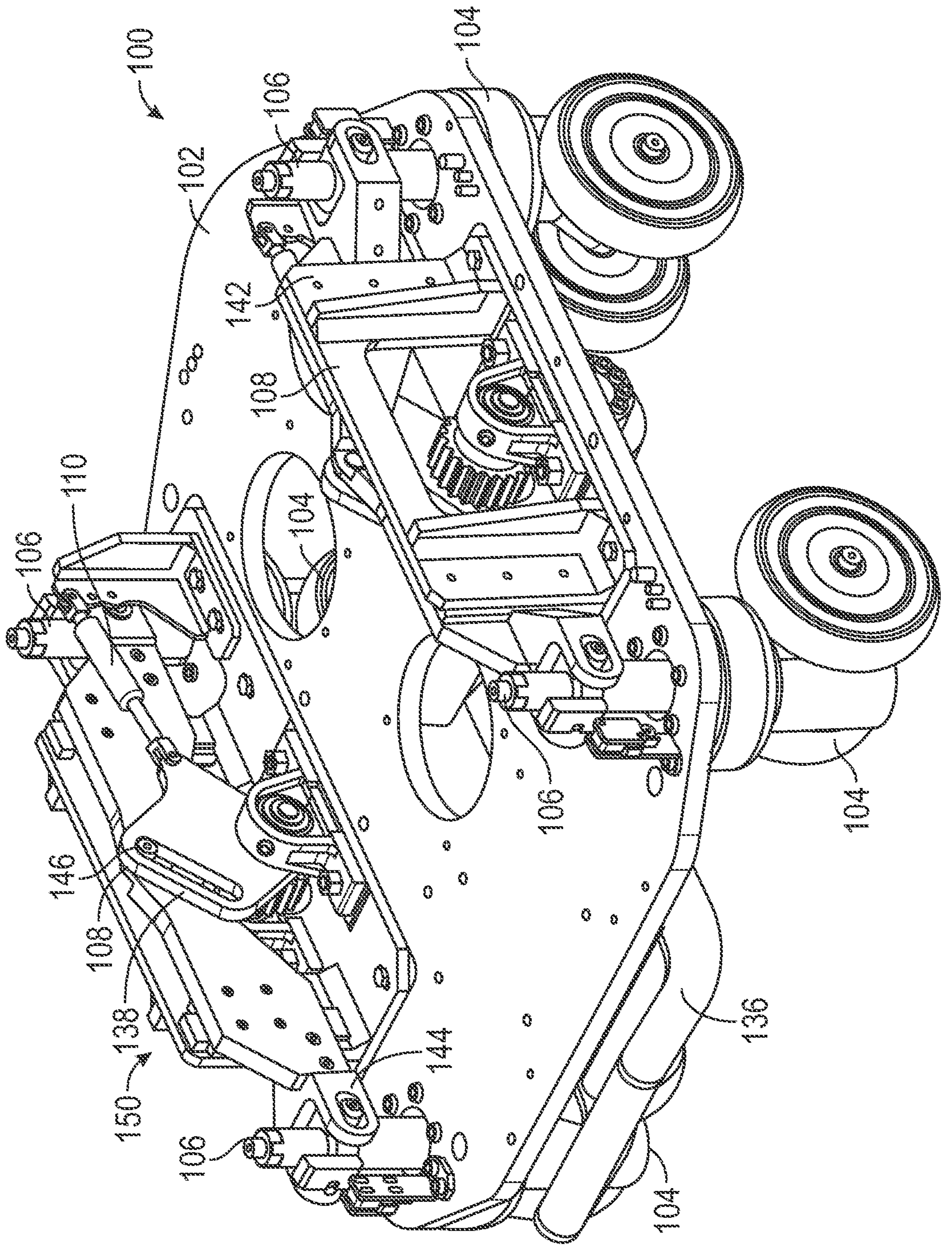
FIG. 6 is a perspective view of a trolley in a first position, in accordance with at least one example of the present disclosure.

FIG. 6 is a perspective view of an example of the trolley 100 in the first position 150. The first position 150 can be configured to allow the trolley 100 to move about the room without braking or stabilization of the trolley 100. As shown in FIG. 6, in the first position 150, the engagement mechanism 136 can be in an up, and or deactivated position. When the engagement mechanism 136 is in a deactivated position, the gears of the engagement mechanism 136 can hold the gears of the cam 138 in a most counter-clockwise position. When the engagement mechanism 136 is in the most counter-clockwise position, the spring 110 is extended to hold the engagement mechanism 136 in the most counter-clockwise position. When the engagement mechanism 136 is in the most counter-clockwise position, the pin of the lift bar 140 can be within the slot 146 of the cam 138 such that the lift bar 140 is in a position farthest away from the frame 102. When the lift bar 140 is in the position farthest away from the frame 102, the attachment mechanism 144 of the lift bar 140 can engage with the engagement mechanism 136 of the first sheath 128 of the stabilizer cartridges 106 to hold the stabilizer cartridges 106 in a position such that the contact foot 134 of the second sheath 130 does not contact the surface of the floor. When the contact foot 134 does not contact the floor, the trolley 100 can freely move around the room without applying a braking force or a stabilizing force to the floor.

Figure 7:
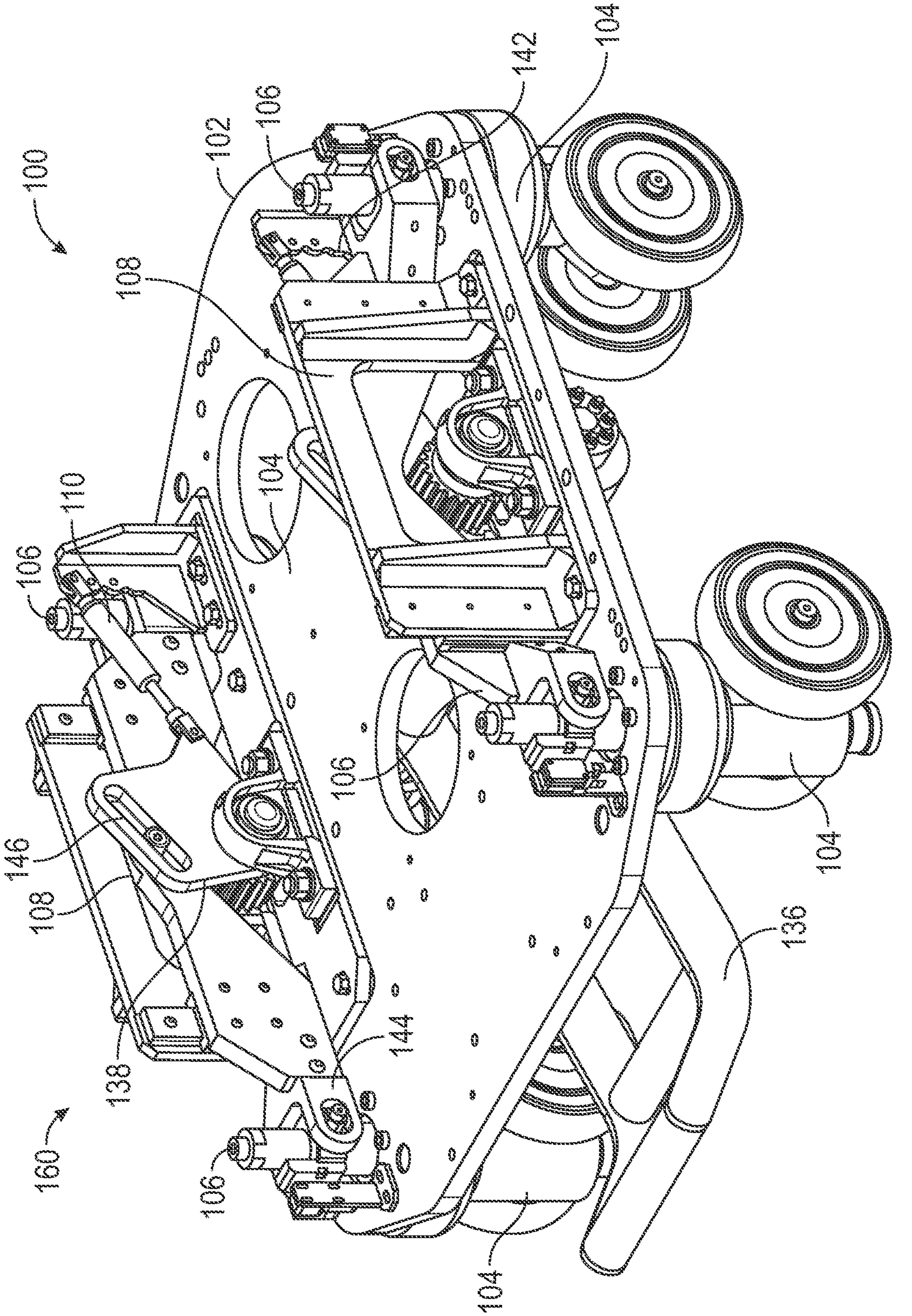
FIG. 7 is a perspective view of a trolley in a second position, in accordance with at least one example of the present disclosure.

FIG. 7 is a perspective view of an example of the trolley 100 in the second position 160. The second position 160 can be configured to apply a braking force to help maintain a position or slow down the movement of the trolley 100. As shown in FIG. 7, in the second position 160, the engagement mechanism 136 can be in a middle or a partially-engaged position. In the partially-engaged position, the gears of the engagement mechanism 136 can hold the gears of the cam 138 in a neutral position between the most counter-clockwise position and a most clockwise position. When the engagement mechanism 136 is in the neutral position, the spring 110 can be extended to maintain the engagement mechanism 136 in the neutral position. When the engagement mechanism 136 is in the neutral position, the pin of the lift bar 140 can be within the slot 146 of the cam 138 such that the lift bar 140 is in a middle position from the frame 102. The middle position from the frame 102 can be between the position farthest away from the frame 102 and a position closest to the frame 102. When the lift bar 140 is in the middle position from the frame 102, the attachment mechanism 144 of the lift bar 140 engages with the engagement mechanism 136 of the first sheath 128 of the stabilizer cartridges 106 to hold the stabilizer cartridges 106 in a position such that the contact foot 134 of the second sheath 130 contacts the surface of the floor. When the contact foot 134 contacts the surface of the floor, the contact foot 134 can apply a braking force to hold the trolley 100 in a position or to slow down the movement of the trolley 100.

Figure 8:
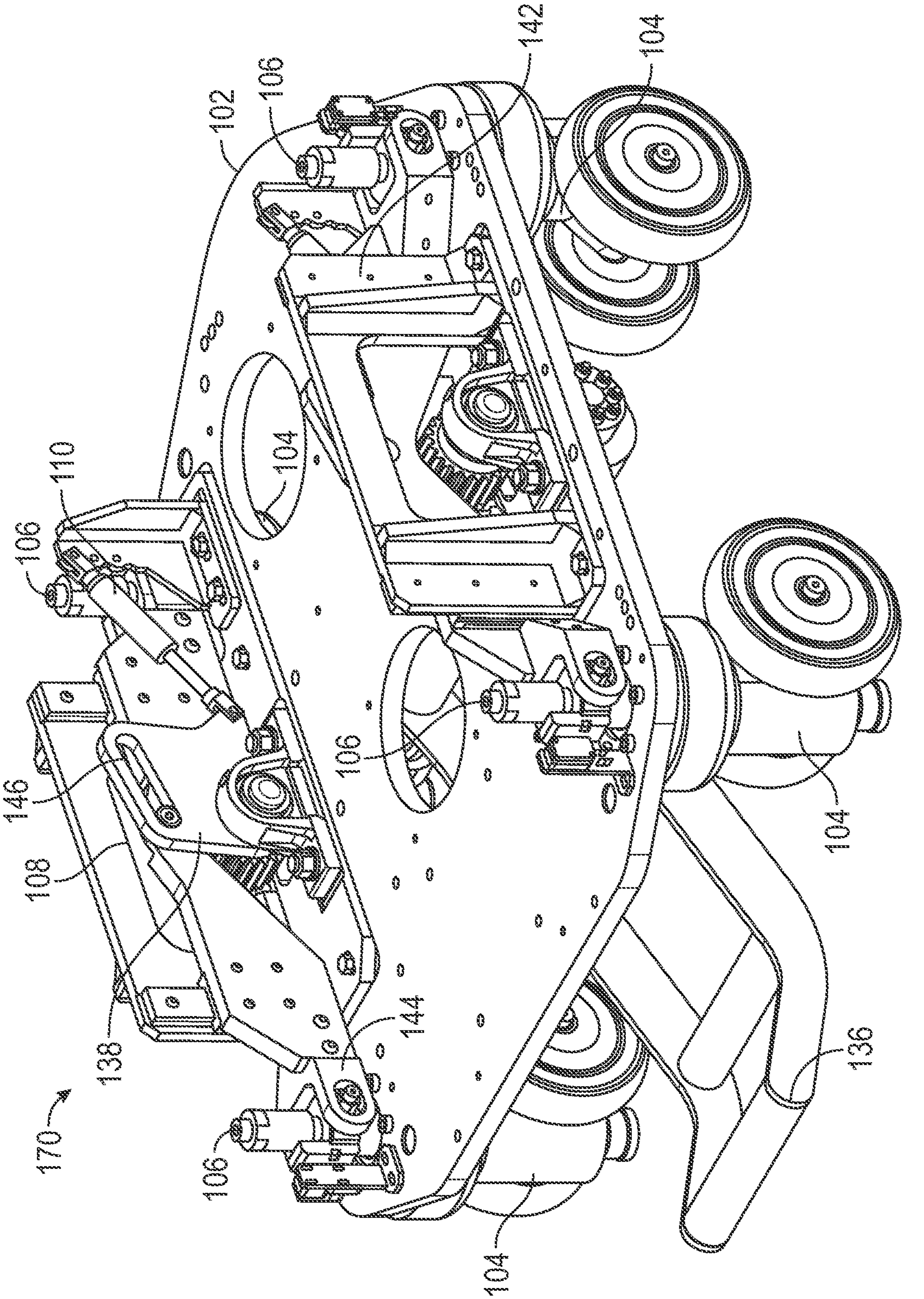
FIG. 8 is a perspective view of a trolley in a third position, in accordance with at least one example of the present disclosure.

FIG. 8 is a perspective view of an example of the trolley 100 in the third position 170. The third position 170 can be configured to stabilize the trolley 100. As shown in FIG. 8, in the third position 170, the engagement mechanism 136 can be in a down or a fully-engaged position. In the fully-engaged position, the gears of the engagement mechanism 136 can hold the gears of the cam 138 in the most clockwise position. When the engagement mechanism 136 is in the most clock-wise position, the spring 110 can be extended to maintain the engagement mechanism 136 in the most clockwise position. When the engagement mechanism 136 is in the most-clockwise position, the pin of the lift bar 140 can be within the slot 146 of the cam 138 such that the lift bar 140 is in the position closest to the frame 102. When the lift bar 140 is in the position closest to the frame 102, the attachment mechanism 144 of the lift bar 140 engages with the engagement mechanism 136 of the first sheath 128 of the stabilizer cartridges 106 to hold the stabilizer cartridges 106 in a position such that the stabilizer cartridges 106 is fully extending within the wheel assemblies 104 and the contact foot 134 of the second sheath 130 contacts and applies a stabilizing force to the surface of the floor. When the stabilizer cartridges 106 is fully extended, the spring 126 of the stabilizer cartridges 106 is compressed. When the spring 126 of the stabilizer cartridges 106 is compressed the contact foot 134 can exert a force on the floor equal to the predetermined spring force of the spring 126.

The positioning of the spring 110 between the frame 102 and the cam 138 can help stabilize the actuator modules 108 and the trolley 100. In examples, the spring 110 can be pivotably attached to the frame 102 and pivotably attached to the actuator modules 108 such that the spring 110 can engage with the cam 138 as the cam 138 between positions. For example, the spring 110 can exert a force on the cam 138 as the cam 138 and the actuator modules 108 are moving between the first position 150, the second position 160, and the third position 170 to stabilize the movements of the actuator modules 108. For example, the spring 110 can exert a force on the cam 138 to prevent any quick or impactful movements of the actuator modules 108. The constant force that the spring 110 can exert on the cam 138 can help dissipate energy to ensure smooth operation of the actuator modules 108. The energy dissipation of the spring 110 can help stabilize the trolley 100 and reduce stresses on the robot or implement attached to the trolley 100.

Figure 9:
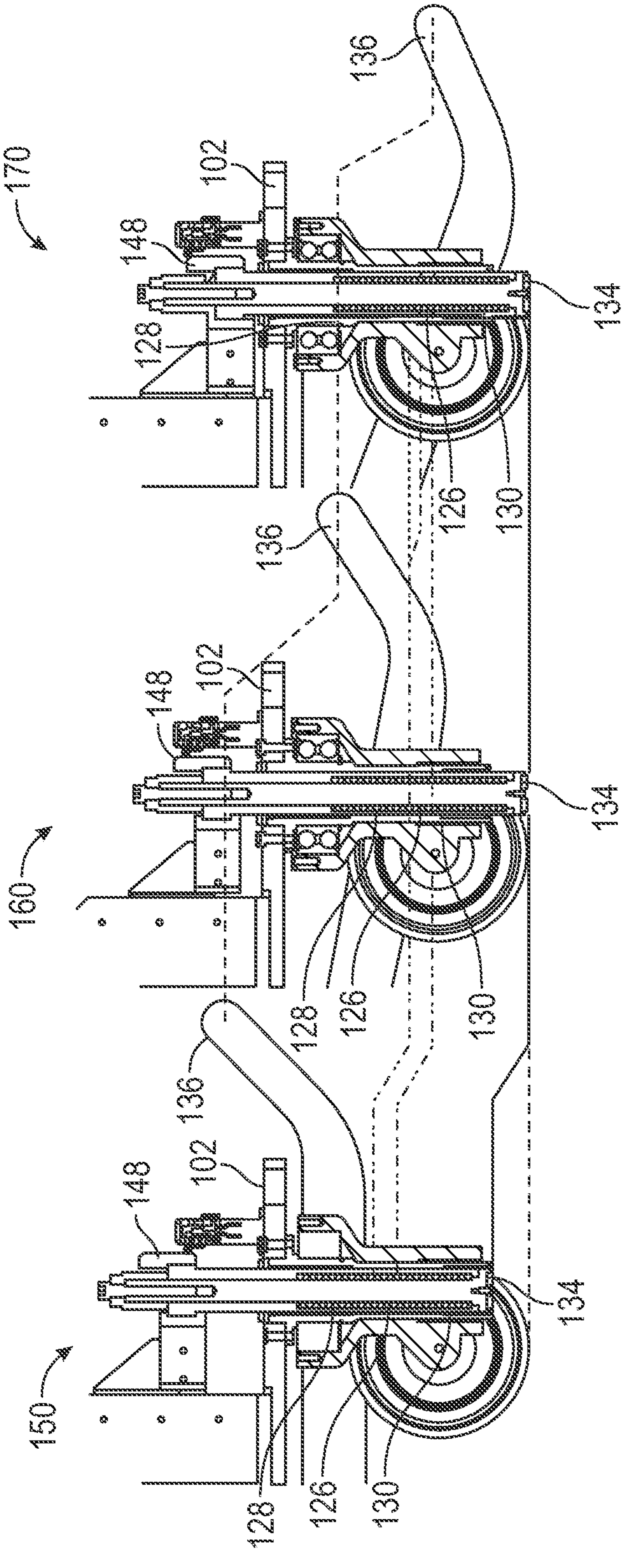
FIG. 9 is a schematic diagram of a trolley with a wheel assembly and a stability cartridge while a trolley is in a first, a second, and a third position, in accordance with at least one example of the present disclosure.

FIG. 9 is a schematic diagram showing the trolley 100 in the first position 150, the second position 160, and the third position 170. As discussed above, the engagement mechanism 136 can be actuated to articulate the actuator modules 108 between the first position 150, the second position 160, and the third position 170.

As shown in FIG. 9, the engagement mechanism 136 can be in an upward position, or a position farthest away from the floor. In the upward position, the engagement mechanism 136 can position the stabilizer cartridges 106 and the actuator modules 108 in the first position 150. When the stabilizer cartridges 106 is in the first position 150, the contact foot 134 of the second sheath 130 may not contact the surface of the floor. Moreover, in the first position 150, the spring 126 may not be compressed and the first sheath 128 and the second sheath 130 can have a resting gap therebetween.

As shown in FIG. 9, the engagement mechanism 136 can be in a middle position, or a position between the upward position and a downward position. In the middle position, the engagement mechanism 136 can position the stabilizer cartridges 106 and the actuator modules 108 in the second position 160. When the stabilizer cartridges 106 is in the second position 160, the contact foot 134 of the second sheath 130 can contact the surface of the floor. Moreover, in the second position 160, the spring 126 can be partially compressed and the first sheath 128 and the second sheath 130 can have a resting gap therebetween. In another example, the gap between the first sheath 128 and the second sheath 130 can be slightly less than the resting gap between the first sheath 128 and the second sheath 130 when the stabilizer cartridges 106 and the actuator modules 108 are in the first position 150.

As also shown in FIG. 9, the engagement mechanism 136 can be in a downward position, or a position closest to the floor. In the downward position, the engagement mechanism 136 can position the stabilizer cartridges 106 and the actuator modules 108 in the third position 170. When the stabilizer cartridges 106 is in the third position 170, the contact foot 134 of the second sheath 130 can contact the surface of the floor. Moreover, in the third position 170, the spring 126 can be compressed such that the engagement mechanism 136 can exert a force equal to a spring force of the spring 126 on the surface of the floor, and the gap between the first sheath 128 and the second sheath 130 is less than the gap between the first sheath 128 and the second sheath 130 when the stabilizer cartridges 106 and the actuator modules 108 are in the first position 150 or the second position 160.

As also shown in FIG. 9, in position 170, there can be a gap between the first sheath 128 and the second sheath 130 such that the spring 126 is not fully compressed. Additional compression of the spring 126 can occur if the trolley 100 encounters an obstacle on the floor. For example, if any of the wheels 118 contacts a cable, cap, or any other obstacle, the spring 126 can further compress. Moreover, the spring 126 is not fully compressed to help compensate for imperfections of the flooring. For example, the spring 126 can be adjusted such as to provide flexibility for use of different floor imperfections. For example, the design of the spring 126 can accommodate floor imperfections of ±1-10 mm. In another example, the spring 126 can be designed to accommodate any floor imperfections the trolley 100 is required to operate thereon.

In examples, the stabilizer cartridges 106 can include alternative compression mechanisms. For example, the stabilizer cartridges 106 can include a gas compression cartridge that utilizes air or any other gas to actuate and apply a pressure to a surface of the floor. In yet another example, the stabilizer cartridges 106 can have a elastic material instead of a spring 126. For example, the stabilizer cartridges 106 can have an elastic rubber, high-density foam, or any other elastic material that can be compressed to apply a surface on the floor.

In examples, the actuator modules 108 of the trolley 100 can be attached to one or more controllers. The controllers can include one or more processors, microprocessors, microcontrollers, electronic control modules (ECMs), electronic control units (ECUs), programmable logic controller (PLC), or any other suitable means for controlling the actuator modules 108 of the trolley 100. The controller can be configured to operate according to a predetermined algorithm or set of instructions for controlling the actuator modules 108 and/or the trolley 100 based on various operating conditions of the actuator modules 108 and/or the trolley 100, such as can be determined from output of any of the various sensors. Such an algorithm or set of instructions can be stored in a database, can be read into an on-board memory of the controller, or preprogrammed onto a storage medium or memory accessible by the controller, for example, in the form of a floppy disk, hard drive, optical medium, random access memory (RAM), read-only memory (ROM), or any other suitable computer-readable storage medium commonly used in the art (each referred to as a "database"), which can be in the form of a physical, non-transitory storage medium.

The controller can be in electrical communication or connected to actuator modules 108, or the like. The actuator modules 108 can comprise an engine, a hydraulic motor, and a hydraulic system including various pumps, reservoirs, actuators, or combinations thereof. In another example, the controller can be in communication with a power source that controls the wheel assemblies 104. The power source on the wheel assemblies 104 can navigate the trolley 100 around the room and can communicate the position of the trolley 100 back to the controllers.

The controller, including a human-machine interface or an operator interface, can include various output devices, such as screens, video displays, monitors and the like that can be used to display information, warnings, data, such as text, numbers, graphics, icons, and the like, regarding the status of the trolley 100. For example, the position of the actuator modules 108 or whether the trolley 100 is in a stabilized position.

As shown in FIG. 9, the stabilizer cartridges 106 can include a position sensor 148. The position sensor 148 can be configured to verify the position of the stabilizer cartridges 106. In another example, the position sensor 148 can be attached to the frame 102 or the wheel assemblies 104. In yet another example, the position sensor 148 can be attached to or integral to the contact foot 134. In examples, the position sensor 148 can be a proximity sensor, a strain gauge, a pressure sensor, a linear displacement sensor, or any other sensor that can be used to verify the position of the stabilizer cartridges 106.

The controller, including the operator interface, can additionally include a plurality of input interfaces for receiving information and command signals from sensors, for example, the position sensor 148, or any other sensor on the trolley 100 and a plurality of output interfaces for sending control signals to actuators on the trolley 100, for example, the actuator modules 108. In examples, the position sensor 148 can be in communication with the controller such that the position sensor 148 can send a signal to the controller that is indicative of the position of the stabilizer cartridges 106 and/or the actuator modules 108. In yet another example, the controller can compare a detected pressure or force via the position sensor 148 and compare that to the pre-determined force of the spring 126 of the actuator modules 108 and track a trend of the relationship between the detected pressure or force and the pre-determined force of the spring 126. Moreover, the controller can have parameters that will alert the user of an error if a trend indicative of wear or damage to the spring 126 occurs, or if the detected pressure or force is a set variance from the pre-determined spring force of the spring 126.

With regard to input, the controller can receive signals or data from the operator interface, the position sensor 148, and the like. The controller can send a signal to the actuator modules 108 to articulate or position the stabilizer cartridges 106 and the actuator modules 108 in the first position 150, the second position 160, or the third position 170. In examples, the controllers can be integrated with the robot or the implement attached to the trolley such that the same controller, or controllers, can control the trolley and the robot or implement simultaneously.

Figure 10:
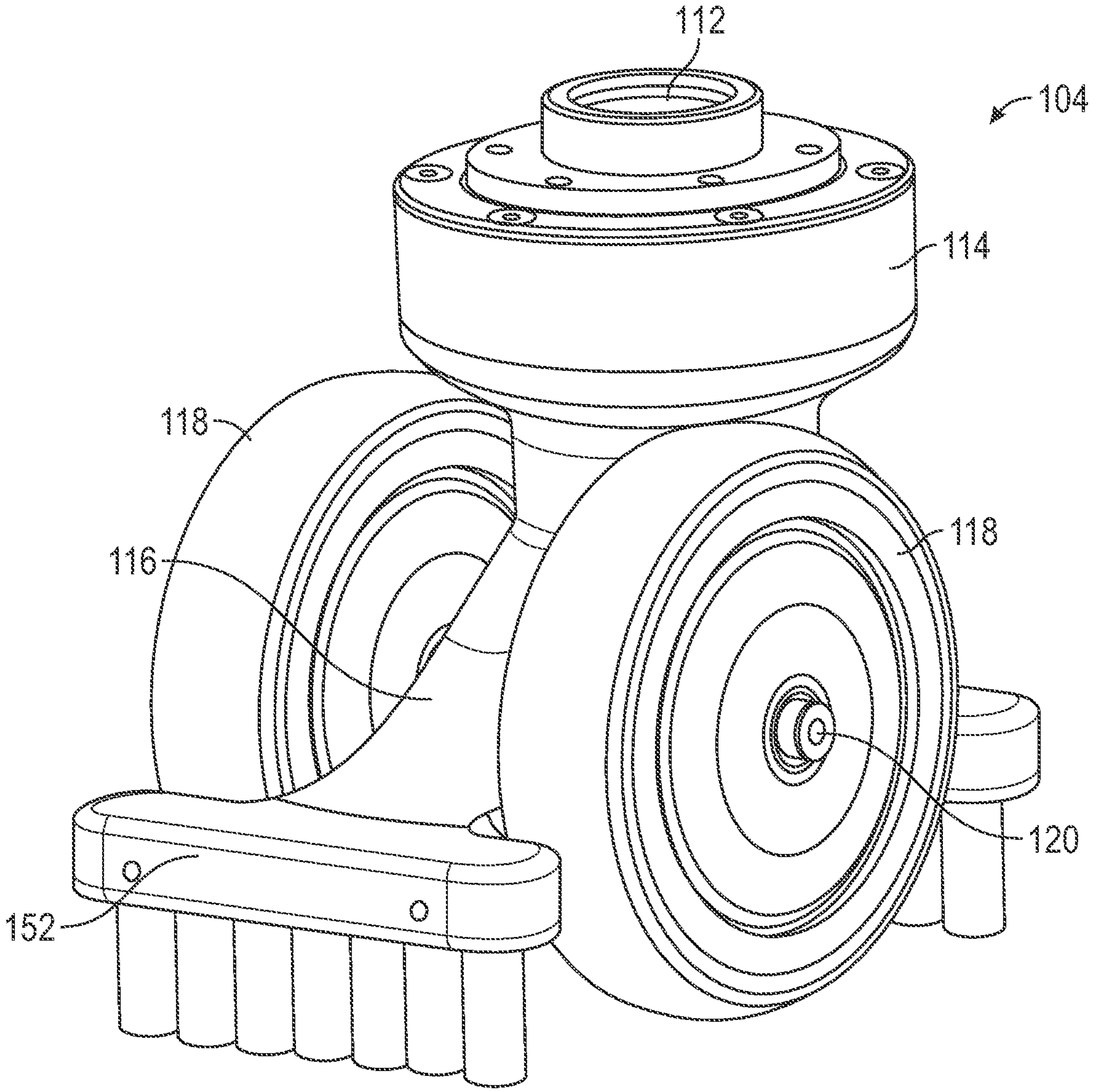
FIG. 10 is a perspective view of an example of a wheel assembly, in accordance with at least one example of the present disclosure.

FIG. 10 is a perspective view of another example of the wheel assemblies 104. As shown in FIG. 10, the wheel assemblies 104 may include a blocker or pusher (hereinafter a blocker 152). The blocker 152 can be configured to block cords or other debris on the floor from into the wheel assemblies 104 and obstruct either of the wheels 118. In the example of FIG. 10, the blocker 152 can have multiple bristles, pedestals, or fingers extending therefrom toward the surface of the floor. In another example, the blocker 152 can include one or more squeegees that help prevent cords or debris from getting into the wheel assemblies 104 and obstructing the wheels 118. In examples, the blocker 152 can be flexible such that the hereinafter blocker 152 can bend as the wheel assemblies 104 travels over a bump or a cable cover on the floor. In yet another example, the blocker 152 can be any configuration that can keep the wheels 118 clear from debris or cords.

In examples, alternative designs of the 104 can be contemplated. For example, the trolley 100 can have any number of the wheel assemblies 104 installed to help move and stabilize the trolley 100. Additionally, the wheels 118 can swivel against a center axis, or an offset axis. In another example, the wheels 118 can be fixed such as to prevent rotation about one or more axis. In yet another example, the trolley 100 can include one or more wheel assemblies 104 that are fixed to prevent rotation of the wheels 118 around an axis, and one or more wheel assemblies 104 that are designed to rotate about an axis.

Any of the wheels 118 (e.g., the wheels 118 that can rotate about an axis, or the wheels 118 fixed to prevent such rotation about an axis) can include the stabilizer cartridges 106. In examples, each of the wheel assemblies 104 attached to the trolley 100 can include the stabilizer cartridges 106. In another example, only one of the wheel assemblies 104 can include stabilizer cartridges 106. In examples, any number of the wheel assemblies 104 attached to the trolley 100 can include the stabilizer cartridges 106. Each of the stabilizer cartridges 106 attached to the trolley 100 can be designed to enact the same force on the surface of the floor. In another example, each of the stabilizer cartridges 106 can be configured to enact a unique force on the surface of the floor. In yet another example, any configuration of different forces can be applied by each of the stabilizer cartridges 106 attached to the trolley 100.

As discussed herein, the trolley (e.g., the trolley 100) can be used to support a surgical robot. In examples, the trolley 100 can be used to support other devices, such as, for example, cameras, tools, landmark registration placards, any other device that can benefit from stabilization or braking, or the like.

NOTES AND EXAMPLES

The following, non-limiting examples, detail certain aspects of the present subject matter to solve the challenges and provide the benefits discussed herein, among others.

Example 1 is a trolley configured to maneuver an implement on a surface of a floor, the trolley comprising: a frame configured to attach to the implement; a first wheel assembly attached to the frame opposite the implement; a second wheel assembly attached to the frame opposite the implement, the first and second wheel assemblies each having a hollow center shaft; a first stabilizer cartridge inserted into the hollow center shaft of the first wheel assembly; a second stabilizer cartridge inserted into the hollow center shaft of the second wheel assembly; and an actuator module attached to the frame and the first and second stabilizer cartridges, the actuator module moves the first and second stabilizer cartridges within the hollow center shaft of the first and second wheel assemblies, respectively.

In Example 2, the subject matter of Example 1 optionally includes wherein the actuator module moves the first and second stabilizer cartridges between a first position, a second position, and a third position.

In Example 3, the subject matter of Example 2 optionally includes wherein: in the first position, the first and second stabilizer cartridges are positioned away from the surface of the floor; in the second position, the first and second stabilizer cartridges contact the surface of the floor; and in the third position, the first and second stabilizer cartridges are extended such that the first and second stabilizer cartridges apply a pre-determined force to the surface of the floor to stabilize the trolley.

In Example 4, the subject matter of Example 3 optionally includes wherein each of the first and second wheel assemblies further comprise: a hub surrounding the hollow center shaft, the hub configured to be attached to the frame of the trolley; a housing connected to the hub and surrounding the hollow center shaft, the housing configured to receive an axle; and a pair of wheels configured to receive the axle opposite one another of the hollow center shaft.

In Example 5, the subject matter of Example 4 optionally includes wherein the first and second wheel assemblies further comprise: a first bearing assembly between the hub and the hollow center shaft; and a second bearing assembly between the housing and the hollow center shaft.

In Example 6, the subject matter of Example 5 optionally includes wherein the first bearing assembly comprises ball bearings.

In Example 7, the subject matter of any one or more of Examples 5-6 optionally include wherein the second bearing assembly comprises a sleeve bearing.

In Example 8, the subject matter of any one or more of Examples 3-7 optionally include wherein the actuator module further comprises: an engagement mechanism connected to the frame; a cam pivotally attached to the frame and mechanically connected to the engagement mechanism, the cam having a slot formed therein; a lift bar having a pin configured to mechanically attach the lift bar to the cam such that the pin slides within the slot to move the lift bar as the cam is rotated; a linear motion system attached to the frame and mechanically coupled to the lift bar, the linear motion system limits degrees of freedom of the lift bar such that the lift bar primarily moves toward and away from the frame of the trolley; and an attachment mechanism mechanically attached to the lift bar and configured to be attached to the first and second stabilizer cartridges to move the first and second stabilizer cartridges into the first position, the second position, or the third position based on the positioning of the engagement mechanism.

In Example 9, the subject matter of Example 8 optionally includes wherein the each of the first and second stabilizer cartridges comprises: a spring configured to compress as the first and second stabilizer cartridges contact the surface of the floor; a lower sheath at least partially surrounding the spring, the lower sheath includes a rubber foot configured to contact the surface of the floor; and an upper sheath at least partially surrounding the spring, the upper sheath is configured to attach to the attachment mechanism of the actuator module, the upper sheath having a groove formed therein configured to prevent the spring from moving through the upper sheath as the first and second stabilizer cartridges contact the surface of the floor.

In Example 10, the subject matter of Example 9 optionally includes wherein the spring comprises a stiffness and the stiffness of the spring determines the pre-determined force applied from the first and second stabilizer cartridges onto the surface of the floor.

In Example 11, the subject matter of any one or more of Examples 9-10 optionally include wherein the first and second stabilizer cartridges further comprise a sensor configured to detect the position of the first and second stabilizer cartridges and send a signal indicative of the trolley being stabilized.

In Example 12, the subject matter of any one or more of Examples 3-11 optionally include a third wheel assembly attached to the frame opposite the implement; a fourth wheel assembly attached to the frame opposite the implement, the third and fourth wheel assemblies each having a hollow center shaft; a third stabilizer cartridge configured to be inserted into the hollow center shaft of the third wheel assembly; a fourth stabilizer cartridge configured to be inserted into the hollow center shaft of the fourth wheel assembly; and a second actuator module attached to the frame and the first and second stabilizer cartridges, the second actuator module configured to move the third and fourth stabilizer cartridges within the hollow center shaft of the third and fourth wheel assemblies, respectively, to position the third and fourth stabilizer cartridges in a first position, a second position, and a third position: in the first position, the third and fourth stabilizer cartridges are positioned away from the surface of the floor; in the second position, the third and fourth stabilizer cartridges contact the surface of the floor; and in the third position, the third and fourth stabilizer cartridges are extended such that the first and second stabilizer cartridges apply a force to the surface of the floor to stabilize the trolley.

In Example 13, the subject matter of Example 12 optionally includes wherein each of the third and fourth wheel assemblies further comprises: a hub surrounding the hollow center shaft, the hub configured to be attached to the frame of the trolley; a housing connected to the hub and surrounding the hollow center shaft, the housing configured to receive an axle; and a pair of wheels configured to receive the axle on opposite sides of the hollow center shaft.

In Example 14, the subject matter of Example 13 optionally includes wherein the third and fourth wheel assemblies further comprise: a first bearing assembly between the hub and the hollow center shaft; and a second bearing assembly between the housing and the hollow center shaft, wherein the first bearing assembly comprises ball bearings and the second bearing assembly comprises a sleeve bearing.

In Example 15, the subject matter of any one or more of Examples 12-14 optionally include wherein the second actuator module further comprises: an engagement mechanism connected to the frame; a cam pivotally attached to the frame and mechanically connected to the engagement mechanism, the cam having a slot formed therein; a lift bar having a pin configured to mechanically attach the lift bar to the cam such that the pin slides within the slot to move the lift bar as the cam is rotated; a linear motion system attached to the frame and mechanically coupled to the lift bar, the linear motion system limits degrees of freedom of the lift bar such that the lift bar primarily moves toward and away from the frame of the trolley; and an attachment mechanism mechanically attached to the lift bar and configured to be attached to the first and second stabilizer cartridges to move the first and second stabilizer cartridges into the first position, the second position, or the third position based on the positioning of the engagement mechanism.

In Example 16, the subject matter of Example 15 optionally includes wherein the each of the third and fourth stabilizer cartridges comprises: a spring configured to compress as the first and second stabilizer cartridges contact the surface of the floor; a lower sheath at least partially surrounding the spring, the lower sheath includes a rubber foot configured to contact the surface of the floor; and an upper sheath at least partially surrounding the spring, the upper sheath is configured to attach to the attachment mechanism of the actuator module, the upper sheath having a groove formed therein configured to prevent the spring from moving through the upper sheath as the first and second stabilizer cartridges contact the surface of the floor.

In Example 17, the subject matter of Example 16 optionally includes wherein the spring comprises a stiffness and the stiffness of the spring determines the pre-determined force applied from the first and second stabilizer cartridges on to the surface of the floor.

In Example 18, the subject matter of any one or more of Examples 16-17 optionally include wherein the first and second stabilizer cartridges further comprise a sensor configured to detect the position of the first and second stabilizer cartridges and send a signal indicative of the trolley being stabilized.

Example 19 is a trolley for moving and stabilizing a surgical robot within an operating room, the trolley comprising: a frame configured to attach to the surgical robot; two or more wheel assemblies, each of the two or more wheel assemblies including a hollow center shaft; a stabilization cartridge configured to be inserted into the hollow center shaft of each of the two or more wheel assemblies; and one or more actuator modules, each of the one or more actuator modules attached to the frame and the stabilization cartridge within each of the two or more wheel assemblies, the actuator module configured to move each of the stabilization cartridges within the hollow center shaft of the two or more wheel assemblies to a first position, a second position, and a third position.

In Example 20, the subject matter of Example 19 optionally includes wherein: in the first position, the stabilizer cartridge within each of the two or more wheel assemblies does not contact a floor of the operating room; in the second position, the stabilizer cartridge within each of the two or more wheel assemblies contacts the floor of the operating room; and in the third position, the stabilizer cartridge within each of the two or more wheel assemblies is extended such that the stabilizer cartridge within each of the two or more wheel assemblies apply a pre-determined force on the floor of the operating room to stabilize the trolley.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A trolley configured to maneuver an implement on a surface of a floor, the trolley comprising:

a frame configured to attach to the implement;

a first wheel assembly attached to the frame opposite the implement;

a second wheel assembly attached to the frame opposite the implement, the first and second wheel assemblies each having a hollow center shaft;

a first stabilizer cartridge inserted into the hollow center shaft of the first wheel assembly;

a second stabilizer cartridge inserted into the hollow center shaft of the second wheel assembly; and an actuator module attached to the frame and the first and second stabilizer cartridges, the actuator module moves the first and second stabilizer cartridges within the hollow center shaft of the first and second wheel assemblies, respectively, the actuator module moves the first and second stabilizer cartridges between a first position, a second position, and a third position, the actuator module comprising:

an engagement mechanism connected to the frame;

a cam pivotally attached to the frame and mechanically connected to the engagement mechanism, the cam having a slot formed therein;

a lift bar having a pin configured to mechanically attach the lift bar to the cam such that the pin slides within the slot to move the lift bar as the cam is rotated;

a linear motion system attached to the frame and mechanically coupled to the lift bar, wherein the linear motion system limits degrees of freedom of the lift bar such that the lift bar moves toward and away from the frame of the trolley; and an attachment mechanism mechanically attached to the lift bar and configured to be attached to the first and second stabilizer cartridges to move the first and second stabilizer cartridges into the first position, the second position, or the third position based on the positioning of the engagement mechanism.

2. The trolley of claim 1, wherein:

in the first position, the first and second stabilizer cartridges are positioned away from the surface of the floor;

in the second position, the first and second stabilizer cartridges contact the surface of the floor; and in the third position, the first and second stabilizer cartridges are extended such that the first and second stabilizer cartridges apply a pre-determined force to the surface of the floor to stabilize the trolley.

3. The trolley of claim 2, wherein each of the first and second wheel assemblies further comprise:

a hub surrounding the hollow center shaft, the hub attached to the frame of the trolley;

a housing connected to the hub and surrounding the hollow center shaft, the housing receive an axle; and a pair of wheels receive the axle opposite one another of the hollow center shaft.

4. The trolley of claim 3, wherein the first and second wheel assemblies further comprise:

a first bearing assembly between the hub and the hollow center shaft; and a second bearing assembly between the housing and the hollow center shaft.

5. The trolley of claim 4, wherein the first bearing assembly comprises ball bearings.

6. The trolley of claim 4, wherein the second bearing assembly comprises a sleeve bearing.

7. The trolley of claim 2, wherein the each of the first and second stabilizer cartridges comprises:

a spring configured to compress as the first and second stabilizer cartridges contact the surface of the floor;

a lower sheath at least partially surrounding the spring, the lower sheath includes a rubber foot configured to contact the surface of the floor; and an upper sheath at least partially surrounding the spring, the upper sheath is configured to attach to the attachment mechanism of the actuator module, the upper sheath having a groove formed therein configured to prevent the spring from moving through the upper sheath as the first and second stabilizer cartridges contact the surface of the floor.

8. The trolley of claim 7, wherein the spring comprises a stiffness and the stiffness of the spring determines the pre-determined force applied from the first and second stabilizer cartridges onto the surface of the floor.

9. The trolley of claim 7, further comprising a sensor, wherein the sensor is configured to detect the position of the first and second stabilizer cartridges and send a signal indicative of the trolley being stabilized.

10. The trolley of claim 2, further comprising:

a third wheel assembly attached to the frame opposite the implement;

a fourth wheel assembly attached to the frame opposite the implement, the third and fourth wheel assemblies each having a hollow center shaft;

a third stabilizer cartridge inserted into the hollow center shaft of the third wheel assembly;

a fourth stabilizer cartridge inserted into the hollow center shaft of the fourth wheel assembly; and a second actuator module attached to the frame and the first and second stabilizer cartridges, the second actuator module moves the third and fourth stabilizer cartridges within the hollow center shaft of the third and fourth wheel assemblies, respectively, to position the third and fourth stabilizer cartridges in a first position, a second position, and a third position:

in the first position, the third and fourth stabilizer cartridges are positioned away from the surface of the floor;

in the second position, the third and fourth stabilizer cartridges contact the surface of the floor; and in the third position, the third and fourth stabilizer cartridges are extended such that the first and second stabilizer cartridges apply a force to the surface of the floor to stabilize the trolley.

11. The trolley of claim 10, wherein each of the third and fourth wheel assemblies further comprises:

a hub surrounding the hollow center shaft, the hub attached to the frame of the trolley;

a housing connected to the hub and surrounding the hollow center shaft, the housing receives an axle; and a pair of wheels receive the axle on opposite sides of the hollow center shaft.

12. The trolley of claim 11, wherein the third and fourth wheel assemblies further comprise:

a first bearing assembly between the hub and the hollow center shaft; and a second bearing assembly between the housing and the hollow center shaft, wherein the first bearing assembly comprises ball bearings and the second bearing assembly comprises a sleeve bearing.

13. The trolley of claim 10, wherein the second actuator module further comprises:

an engagement mechanism connected to the frame;

a cam pivotally attached to the frame and mechanically connected to the engagement mechanism, the cam having a slot formed therein;

a lift bar having a pin configured to mechanically attach the lift bar to the cam such that the pin slides within the slot to move the lift bar as the cam is rotated;

a linear motion system attached to the frame and mechanically coupled to the lift bar, wherein the linear motion system limits degrees of freedom of the lift bar such that the lift bar moves toward and away from the frame of the trolley; and an attachment mechanism mechanically attached to the lift bar and configured to be attached to the first and second stabilizer cartridges to move the first and second stabilizer cartridges into the first position, the second position, or the third position based on the positioning of the engagement mechanism.

14. The trolley of claim 13, wherein the each of the third and fourth stabilizer cartridges comprises:

a spring configured to compress as the first and second stabilizer cartridges contact the surface of the floor;

a lower sheath at least partially surrounding the spring, the lower sheath includes a rubber foot configured to contact the surface of the floor; and an upper sheath at least partially surrounding the spring, the upper sheath is configured to attach to the attachment mechanism of the actuator module, the upper sheath having a groove formed therein configured to prevent the spring from moving through the upper sheath as the first and second stabilizer cartridges contact the surface of the floor.

15. The trolley of claim 14, wherein the spring comprises a stiffness and the stiffness of the spring determines the pre-determined force applied from the first and second stabilizer cartridges on to the surface of the floor.

16. The trolley of claim 14, further comprising a sensor configured to detect the position of the first and second stabilizer cartridges and send a signal indicative of the trolley being stabilized.

17. A trolley for moving and stabilizing a surgical robot within an operating room, the trolley comprising:

a frame configured to attach to the surgical robot;

two or more wheel assemblies, each of the two or more wheel assemblies including a hollow center shaft;

at least two stabilization cartridges each of the at least two stabilization cartridges configured to be inserted into the hollow center shaft of each of the two or more wheel assemblies; and one or more actuator modules, each of the one or more actuator modules attached to the frame and one of the at least two stabilization cartridges within each of the two or more wheel assemblies, the actuator module configured to move each of the stabilization cartridges within the hollow center shaft of the two or more wheel assemblies to a first position, a second position, and a third position, the actuator module comprising:

an engagement mechanism connected to the frame;

a cam pivotally attached to the frame and mechanically connected to the engagement mechanism, the cam having a slot formed therein;

a lift bar having a pin configured to mechanically attach the lift bar to the cam such that the pin slides within the slot to move the lift bar as the cam is rotated;

a linear motion system system attached to the frame and mechanically coupled to the lift bar, wherein the linear motion system limits degrees of freedom of the lift bar such that the lift bar moves toward and away from the frame of the trolley; and an attachment mechanism mechanically attached to the lift bar and configured to be attached to the stabilization cartridges to move the stabilization cartridges into the first position, the second position, or the third position based on the positioning of the engagement mechanism.

18. The trolley of claim 17, wherein:

in the first position, the stabilizer cartridge within each of the two or more wheel assemblies does not contact a floor of the operating room;

in the second position, the stabilizer cartridge within each of the two or more wheel assemblies contacts the floor of the operating room; and in the third position, the stabilizer cartridge within each of the two or more wheel assemblies is extended such that the stabilizer cartridge within each of the two or more wheel assemblies applies a pre-determined force on the floor of the operating room to stabilize the trolley.

* * * * *